United States Patent
Thielen

[11] Patent Number: 5,902,517
[45] Date of Patent: *May 11, 1999

[54] CONDUCTIVE POLYACETAL COMPOSITION

[75] Inventor: Alain Thielen, Thimister, Belgium

[73] Assignee: Cabot Corporation, Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/742,579

[22] Filed: Oct. 28, 1996

[51] Int. Cl.$^6$ .............................. H01B 1/24; C08K 3/04
[52] U.S. Cl. .................... 252/511; 524/495; 524/847; 525/63
[58] Field of Search ..................... 252/510, 511; 524/495, 496, 198, 847, 911; 525/63, 66

[56] References Cited

U.S. PATENT DOCUMENTS

| | | | |
|---|---|---|---|
| 3,442,850 | 5/1969 | O'Brien et al. | 260/37 |
| 4,351,916 | 9/1982 | Kohan | 524/377 |
| 4,391,741 | 7/1983 | Masamoto et al. | 252/511 |
| 4,555,357 | 11/1985 | Kausga et al. | 252/511 |
| 4,596,847 | 6/1986 | Kasuga et al. | 524/220 |
| 4,707,525 | 11/1987 | LaNieve, III et al. | 525/399 |
| 4,818,439 | 4/1989 | Blackledge et al. | 252/511 |
| 4,828,755 | 5/1989 | Kusumgar et al. | 252/511 |
| 4,909,961 | 3/1990 | Suzuki et al. | 252/511 |
| 4,929,388 | 5/1990 | Wessling | 252/500 |
| 4,971,726 | 11/1990 | Maeno et al. | 252/511 |
| 5,114,796 | 5/1992 | Frentzel et al. | 428/521 |
| 5,207,949 | 5/1993 | Niino et al. | 252/511 |
| 5,212,222 | 5/1993 | Mitsuuchi et al. | 524/230 |
| 5,354,798 | 10/1994 | Tsukahara et al. | 524/413 |
| 5,393,813 | 2/1995 | Schauhoff et al. | 524/101 |
| 5,415,893 | 5/1995 | Wiersma et al. | 427/385.5 |
| 5,426,141 | 6/1995 | Akao | 524/110 |
| 5,446,086 | 8/1995 | Sugiyama et al. | 524/542 |
| 5,498,372 | 3/1996 | Hedges | 252/511 |

FOREIGN PATENT DOCUMENTS

| | | |
|---|---|---|
| 0167369 | 1/1986 | European Pat. Off. . |
| 0254477 | 1/1988 | European Pat. Off. . |
| 0 327 384 | 8/1989 | European Pat. Off. . |
| 0 339 910 | 11/1989 | European Pat. Off. . |
| 0 565 304 | 10/1993 | European Pat. Off. . |
| 0 605 736 | 7/1994 | European Pat. Off. . |
| 0 668 317 | 8/1995 | European Pat. Off. . |
| 2 537 984 | 6/1984 | France . |
| 01 278 554 | 11/1989 | Japan . |
| WO 89/00098 | 1/1989 | WIPO . |

OTHER PUBLICATIONS

M.M.M Carbon, Ensaco™ 250 Granules, Technical Bulletin. No Date.

Akzo Nobel, Polymer additives, Ketjenblack® EC, Carbon Black Technical Bulletin. No Date.

Kautschuk + Gummi + Kunststoffe, International Technical Journal for Polymer Materials, New Opportunities with a New Carbon Black Process, dated Sep. 1993.

Ensaco Carbon Blacks, Specialty Carbon Blacks for Rubber, Plastics and Paint Industry, The New Carbon Black Technology, Technical Bulletin. No Date.

BFGoodrich Specialty Polymers & Chemicals Division, Stat Rite® Static Dissipative Polymers, Technical Bulletin. No Date.

Hostaform® Acetal copolymer (POM), Polymer materials, Hoechst High Chem®, Hoechst Aktiengesellschaft, Frankfurt am Main, Germany, Jan. 1996.

Ultraform® Polyoxymethylene (POM) Product range, Propeties, Processing, BASF Plastics, Ludwigshafen, Germany, Jun. 1996.

Ultraform® Polyoxymethylene (POM) Range Chart, Features, Typical values, Applications, BASF Plastics, Ludwigshafen, Germany, Jun. 1996.

Primary Examiner—Mark Kopec

[57] ABSTRACT

An electrically conductive polyacetal composition having improved toughness and flexibility, as well as good fluidity and processability. The composition includes an oxymethylene polymer, an elastomeric polyurethane, and an electrically conductive carbon black having a lower structure level (DBP absorption) and larger particle size (lower surface area) than conductive carbon blacks heretofore used in these compositions. The composition includes between about 65 and about 85 percent, by weight, of the oxymethylene polymer, between about 10 and about 20 percent, by weight, of the electrically conductive carbon black, and between about 10 and about 20 percent, by weight, of the elastomeric polyurethane. The electrically conductive carbon black has a surface area BET ($N_2$) of between about 40 and about 100 $m^2/g$, and a pore volume, DBP absorption, of between about 150 and about 350 ml/100g. The electrically conductive carbon black used in the present compositions is more easily dispersed in the composition polymers and lessens any increase in melt viscosity during compounding.

10 Claims, No Drawings

CONDUCTIVE POLYACETAL COMPOSITION

BACKGROUND OF THE INVENTION

1. Field of the Invention

The present invention relates to a conductive polyacetal composition and, more particularly, to a conductive polyacetal composition characterized by improved toughness and flexibility, as well as electrical conductivity, low viscosity and low moisture pick-up.

2. Description of the Related Art

Polyacetal resins, also known as polyoxymethylene (POM) resins, are engineering thermoplastics that have broad use, for example, as replacements for metals in a wide variety of applications. Polyacetal resins typically exhibit excellent mechanical properties, fatigue resistance, wear, abrasion and processability. In some of the resin applications, electrical conductivity is required.

Compounding polyacetal resin with a sufficient amount of an electrically conductive carbon black has been practiced as a method for imparting electrical conductivity to the resin. For example, electrically conductive polyacetal resin compositions are disclosed by Masarnoto et al., in U.S. Pat. No. 4,391,741; and by Kausga et al., in U.S. Pat. No. 4,555,357. One commercially available electrically conductive carbon black, which has been used to form electrically conductive polyacetal resins is KETJENBLACK® EC carbon black (a trademark of Akzo Nobel Chemicals, Inc., Chicago, Ill.). Typical conductive polyacetal compositions include an oxymethylene copolymer and about 6 percent, by weight, of the KETJENBLACK® EC electrically conductive carbon black. While these compositions provide excellent conductivity, the addition of the carbon black reduces the toughness and flexibility of the final molded product. In applications where higher flexibility is required, breakage can occur because of poor elongation and low practical impact strength. Moreover, the electrically conductive carbon black can increase the melt viscosity of the polyacetal resin and degrade the melt flow, which can make processing of the resin by injection molding techniques difficult. In addition, it is known that if the melt viscosity is too high, polyacetal degradation and associated formaldehyde emission during processing (such as compounding or injection molding) can result.

In the view of the above-noted problems associated with the use of electrically conductive carbon blacks in polyacetal resin compositions, lower quantities of generally superconductive types of carbon blacks such as, for example, KETJENBLACK® EC 600 JD carbon black (a trademark of Akzo Nobel) have been used. As disclosed by Kusumgar et al., in U.S. Pat. No. 4,828,755, which is incorporated herein by reference, the lower quantities of superconductive carbon black provide the composition with adequate electrical conductivity with less impact on the resulting processing and mechanical properties. A typical conductive polyacetal composition loading of KETJENBLACK®EC 600 JD carbon black is between about 3 and about 5 percent, by weight. It is noted, however, that the superconductive carbon blacks are generally characterized by a high structure level (high DBP absorption) and a small primary particle size (high surface area, BET $N_2$). Dispersion and processing of the superconductive carbon blacks in the polyacetal composition is difficult, therefore, because of the small primary particle size, and the so obtained final polyacetal composition viscosity can be high due to the carbon black's high structure level and small primary particle size.

It is known to improve the impact strength and flexibility of polyacetal resins containing an electrically conductive carbon black by incorporating a polyurethane into the composition. For example, Kusumgar et al., in U.S. Pat. No. 4,828,755, disclose conductive oxymethylene polymer compositions having enhanced flexibility and toughness by the incorporation of elastomeric polyurethanes.

SUMMARY OF THE INVENTION

Accordingly, the present invention is directed to an electrically conductive polyacetal resin composition including an oxymethylene polymer, an elastomeric polyurethane, and an electrically conductive carbon black having a lower structure level (DBP absorption) and larger particle size (lower surface area) than conductive carbon blacks heretofore used in these compositions. The electrically conductive carbon black used in the compositions of the present invention is more easily dispersed in the composition polymers (polyoxymethylene and polyurethane) to lessen any increase in melt viscosity during compounding, and to provide an electrically conductive composition with improved toughness and flexibility, as well as good fluidity and processability that can be injection-molded, blow-molded, plated, and the like.

In one embodiment of the present invention, an electrically conductive polyacetal resin composition includes between about 65 and about 85 percent, by weight, of an oxymethylene polymer, between about 10 and about 20 percent, by weight, of an electrically conductive carbon black, and between about 10 and about 20 percent, by weight, of an elastomeric polyurethane. The electrically conductive carbon black has a surface area BET ($N_2$) of between about 40 and about 100 $m^2/g$, and a pore volume, DBP absorption, of between about 150 and about 350 ml/100g.

In another embodiment of the present invention, the electrically conductive polyacetal resin composition further includes at least 0.5 percent, by weight, of an antioxidant.

DETAILED DESCRIPTION OF THE INVENTION

The present invention is directed to an electrically conductive polyacetal resin composition. The composition includes an oxymethylene polymer, an elastomeric polyurethane, and an electrically conductive carbon black. The electrically conductive carbon black has a lower structure level, and a larger primary particle size (lower surface area) than conductive carbon blacks heretofore used in these compositions. The electrically conductive carbon black has a surface area, BET ($N_2$), of between about 40 and about 100 $m^2/g$, and a pore volume, DBP absorption, of between about 150 and about 350 ml/100g.

The oxymethylene polymers used in the conductive polyacetal composition of the present invention are well known in the art. The polymers typically have high molecular weight, and are characterized as having a basic molecular structure of repeating carbon-oxygen links in alternating oxymethylene groups, —$OCH_2$—. It is known that homopolymers consist solely of this carbon-oxygen structure, whereas copolymers have the oxymethylene structure occasionally interrupted by a copolymer unit. As used in the present invention, the term oxymethylene polymer is intended to include any oxymethylene homopolymer, copolymer, terpolymer, and the like.

Typically, the homopolymers are prepared by the polymerization of formaldehyde, or by the polymerization of trioxane which is a cyclic trimer of formaldehyde, through monomer purification, polymerization, end-capping with alkyl or acyl groups, and finishing. The commercial oxymethylene copolymers are made by the trimerization of formaldehyde to trioxane, purification of trioxane, copolymerization in the presence of small amounts of ethylene oxide and/or tetrahydrofuran, stabilization by alkaline hydrolysis, and finishing.

Oxymethylene polymers that are particularly well-suited for use in the conductive compositions of the present invention are oxymethylene copolymers. Examples of the oxymethylene polymers used in the present invention are commercially available copolyacetal grades characterized by melt indexes ranging from between about 13 and about 50 g/10 min (190° C./2.15 kg); preferred oxymethylene polymers suitable for use in the conductive compositions of the present invention include copolymers such as, for example, HOSTAFORM® acetal copolymers, (a trademark of Hoechst Aktiengesellschaft, Germany), or ULTRAFORM® polymers (a trademark of BASF Aktiengesellschaft, Germany). Preferably, the conductive polyacetal composition of the present invention includes between about 65 and about 85 percent, by weight, of the oxymethylene polymer. More preferably, the composition includes between about 70 and about 80 percent, by weight, of the oxymethylene polymers; and most preferably, there is about 75 percent, by weight, of the polymer in the overall composition.

Oxymethylene copolymers typically possess a relatively high level of polymer crystalinity, i.e., about 70 to 80 percent. As noted, oxymethylene copolymers have repeating units of —$OCH_2$— groups interspersed with comonomers, for example, as represented by the general formula:

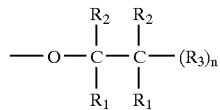

wherein each $R_1$ and $R_2$ comprise hydrogen, lower alkyl and halogen-substituted lower alkyl radicals, each $R_3$ comprise methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive. The polymerization is carried out in the presence of about 0.1 to about 15 mol percent of the comonomer. The copolymer formed comprises of between about 85 and about 99.9 percent of the recurring oxymethylene units (—$OCH_2$—). The comonomer units may be incorporated into the copolymer during the step of copolymerization to produce the copolymer by the breaking of an oxygen-to-carbon linkage.

The oxymethylene copolymers that are preferably present in the molding compositions of the present invention are thermoplastic materials having a melting point of at least 150° C., and are typically millable or processable at a temperature of from about 180° C to about 200° C. Commercial oxymethylene copolymers typically have a number average molecular weight of at least 10,000.

The electrically conductive carbon black used in the present invention has improved properties over the conductive carbon blacks, such as KETJENBLACK® EC carbon blacks, conventionally used in conductive polyacetal compositions.

As noted, the carbon black used in the conductive polyacetal compositions of the present invention is characterized by lower structure level (DBP absorption) (ASTM D-2414) and lower surface area (BET, $N_2$) (ASTM D-3037) than the superconductive carbon blacks. The carbon black in the present composition is a medium surface area and high structure carbon black. It differs however from conventional acetylene blacks by its more graphitic nature, and by the ellipsoid shape of its primary particles (wherein the ratio between the large and small axis is about 1.4).

Preferably, the carbon black used in the conductive compositions of the present invention has a BET nitrogen surface area of between about 40 and about 100 m²/g; preferably, the surface area is between about 40 and about 70 m²/g; and most preferably, the surface area is about 65 m²/g. The pore volume, DBP absorption, of the carbon black is typically between about 150 and about 350 ml/100g. More preferably, the pore volume is between about 150 and about 200 ml/100g; and most preferably, the pore volume is about 190 ml/100g. A particularly usefull carbon black in the present composition is ENSACO# 250 carbon black (a trademark of M.M.M. Carbon, Belgium).

It has been found that the lower structure level and surface area of the carbon black used in the present conductive polyacetal compositions allows higher loadings of the carbon black to be used in the compositions to achieve the desired conductivity, while improving toughness, flexibility, fluidity and processability. The carbon black loadings used in the present invention range from about 10 to about 20 percent, by weight, of the composition. Preferably, there is between about 12 and about 17 percent, by weight, carbon black in the present compositions; and most preferably, the compositions contain about 12 percent, by weight, of the above-referenced carbon black.

Table 1, below, compares the surface area (BET, $N_2$) (m²/g), pore volume (DBP absorption) (cm³/100 g), and volatile content (%) of the conductive carbon black used in the conductive polyacetal compositions of the present invention and other known conductive carbon blacks:

TABLE 1

|  | ENSACO ™ 250 | KETJENBLACK ® EC 600 JD | VULCAN ® XC72 |
|---|---|---|---|
| Surface area (BET, $N_2$) (m²/g) | 65 | 1250 | 254 |
| Pore volume (DBP absorption) (cm³/100 g) | 190 | 510 | 178 |
| Volatile content (%) | 0.15 | 0.7 | 1.5 |

The carbon black used in the conductive polyacetal compositions of the present invention has less undesirable effect on the melt viscosity than the conductive carbon blacks, such as KETJENBLACK® EC carbon blacks. The increase in the composition's viscosity due to the addition of carbon black is directly related to the aggregate structure level and surface area of the carbon black. As noted in Table 1, these parameters are lower for the ENSACO™ 250 carbon black, which is an example of the carbon black used in the present invention. Therefore, compounding and processing of the present compositions is easier, and the lower melt viscosity allows the processing temperature to be maintained below about 200° C. to lessen the possibility of polyacetal decomposition and formaldehyde emission.

In addition, because of the larger primary particle size (low surface area, BET $N_2$) of the carbon black, it can be more readily dispersed within the polymers of the conductive polyacetal compositions of the present invention. The more uniform dispersion of the conductive carbon black can result in improved mechanical properties of the polyacetal compositions, such as a higher impact strength, as well as good electrical conductivity.

As noted above, because the carbon black used in the present invention has less of an adverse impact on the mechanical properties of the polyacetal composition than a typical conductive carbon black, while providing electrical conductivity, higher loadings of the carbon black, ranging from between about 10 and about 20 percent, by weight, can be used. The higher carbon black loading capability allows for the production of a wider variety of compositions, characterized by a wide range of mechanical and electrical properties. Moreover, since the mechanical properties of the polyacetal compositions of the present invention are less affected by the addition of the carbon black, an acetal polymer characterized by lower molecular weight (higher melt index) can also be used for further broadening the range of properties that can be achieved.

Furthermore, it has been found that although the carbon black used in the present invention can have higher loadings than conductive carbon blacks heretofore used in these compositions, the conductive polyacetal compositions of the invention are characterized by a lower moisture pick-up relative to known compositions. It is believed that this effect is directly related to the properties of the carbon black used in the present invention, such as its lower surface area, which provides better dispersion and wettability.

As noted above, the thermoplastic polyurethanes used in the polyacetal compositions of the present invention provide improved toughness and flexibility, and are described in the related art. For example, useful elastomeric polyurethanes are disclosed by Kusumgar et al., in U.S. Pat. No. 4,828,755, which is incorporated herein by reference. Elastomeric polyurethanes which are suitable for improving the impact strength of the oxymethylene polymer composition are those which have been prepared from polyester polyols, polyether polyols, or polyacetals having free hydroxyl end groups, and polyisocyanates, in particular diisocyanates, using chain-extending agents, such as low molecular weight polyols, preferably glycols. The polyurethanes can be prepared by processes which are conventional in the art, such as the one-shot procedure or the prepolymer procedure.

The polymeric polyols and polyol extenders which can be used are those conventionally employed in the art for the preparation of such elastomers. The polymeric polyols are preferably polyester diols, polyether diols, or mixtures thereof having molecular weights between about 400 and about 4000.

The chain-extending agents used in the elastomeric polyurethanes of the present compositions can be any of the diol extenders commnonly employed in the art. For example, aliphatic diols, such as ethylene glycol, 1,3-propylene glycol, 1,2-propylene glycol, 1,4-butanediol, 1,2-hexanediol, neopentyl glycol, and the like, as well as dihydroxyalkylated aromatic compounds.

The polyisocyanates used in the elastomeric polyurethanes of the present compositions can be any of those commonly employed in the preparation of polyurethane elastomers. For example, the polyisocyanates can be a diisocyanate such as 2,4-tolylene diisocyanate, 2,6-tolylene diisocyanate, 4,4'-methylene bis(phenyleneisocyanate), 1,5-napthalene diisocyanate, 1,4-phenylene diisocyanate, and the like, including mixtures of two or more of the above diisocyanates.

A particularly suitable polyurethane elastomer is a low hardness, chain-extended, low molecular weight polyoxirane polymer, such as STAT-RITE® C2300 static dissipative polymers (a trademark of BFGoodrich Chemical, Cleveland, Ohio). Preferably, the conductive polyacetal composition of the present invention includes between about 10 and about 20 percent, by weight, of the polyurethane elastomer. More preferably, the composition includes between about 10 and about 15 percent, by weight, of the polyurethane elastomer; and most preferably, there is about 12 percent, by weight, of the polyurethane in the overall composition.

If desired, the conductive polyacetal composition of the present invention can be stabilized against oxidation and degradation, for example, using a stabilizer particularly suitable for use with polyacetal resins. A preferred antioxidant is ethylenebis (oxyethylene) bis [3-(5-tert-butyl-4-hydroxy-m-tolyl) propionate], which is commercially available as IRGANOX® 245 antioxidant (a trademark of Ciba-Geigy Corp., Hawthorne, N.Y.). If used, there is preferably at least 0.5 percent, by weight, of the antioxidant in the present compositions. More preferably, there is between about 0.2 and about 0.3 percent, by weight, of the antioxidant in the present compositions; and most preferably, there is about 0.3 percent, by weight, of the antioxidant present.

The conductive polyacetal compositions of the present invention may be prepared by any conventional procedure that will result in an intimate blend or mixture of the above components. Preferably, dry or melt blending procedures and equipment are used. For example, the polyurethane elastomer (in the form of pellets, chips, or granules) can be dry mixed with the oxymethylene polymer (in the form of pellets, chips, granules or powder) typically at room temperatures, and the resulting mixture can be melt blended in any conventional type extrusion equipment, which is typically heated to atemperature of between about 180° C. and about 230° C.

The conductive polyacetal composition resulting from the intimate blending procedures can then be comminuted, for example by chopping, pelletizing or grinding, into granules, pellets, chips, flakes or powders, and processed in the thermoplastic state, for example by injection molding or extrusion molding, into shaped articles, for examples, bars, rods, plates, sheets, films, ribbons, tubes and the like.

The present invention will be further illustrated by the following examples which are intended to be illustrative in nature and are not to be construed as limiting the scope of the invention.

EXAMPLE I

To determine the effectiveness of the present electrically conductive polyacetal compositions, it was compared to a commercial polyacetal resin composition. The commercial composition (REFERENCE) was HOSTAFORM® C9021 ELS acetal copolymer, which is typically used for the production of injection-molded, extruded and blow-molded parts and containers. The composition within the scope of the present invention (SAMPLE A) included the following components (percent, by weight):

| | |
|---|---|
| HOSTAFORM ® C52021 acetal polymer (Hoechst) (MFI = 52 g/10 min) | 70.7 |
| STAT-RITE ® C2300 polyurethane (BF Goodrich) | 12.0 |
| ENSACO ™ 250 carbon black (M.M.M. Carbon) | 17.0 |
| IRGANOX ® 245 antioxidant (Ciba-Geigy) | 0.3 |

The samples were compounded and molded. Each sample was evaluated, and the melt flow index (MFI) (g/10 min), Izod impact strength (kJ/m$^2$), tensile modulus (MPa), flexural modulus (MPa), surface resistivity (ohm/sq), and volume resistivity (ohm-cm) were measured. The results are reported below in Table 2.

TABLE 2

|  | MFI (g/10 min) | IZOD IMPACT (kJ/m$^2$) | TENSILE MODULUS (MPa) | FLEXURAL MODULUS (MPa) | SURFACE RESISTIVITY (Ohm/sq.) | VOLUME RESISTIVITY (Ohm·cm) |
|---|---|---|---|---|---|---|
| REFERENCE | 4.1 | 2.2 | 1520 | 1620 | 513 | 32 |
| SAMPLE A | 5.4 | 4.6 | 1740 | 1740 | 30 | 3 |

As shown in Table 2, an electrically conductive polyacetal composition of the present invention, including a polyurethane, carbon black, and an antioxidant, exhibits higher fluidity, higher impact strength, higher module, and higher conductivity than the reference acetal polymer sample.

EXAMPLE II

To determine the effect of the acetal polymer resin fluidity on the mechanical properties of the conductive polyacetal compositions, four samples (A, B, C, and D) were prepared using three different types of HOSTAFORM® acetal polymer resins. The MFI of each resin is 50 g/10 min, 27 g/10 min, and 13 g/10 min. In addition to the acetal polymer, the compositions included various amounts of a polyurethane, carbon black, and an antioxidant within the scope of the present invention. The samples were prepared with the formulations (percent, by weight) listed below in Table 3. Each sample was evaluated, and the melt flow index (MFI) (g/10 min), Izod impact strength (kJ/m$^2$), tensile modulus (MPa), and volume resistivity (ohm-cm) were measured. The results are also reported below in Table 3.

TABLE 3

| SAMPLE: | A | B | C | D |
|---|---|---|---|---|
| Acetal resin | 70.7* | 70.7** | 75.7** | 75.7*** |
| STAT-RITE® C2300p TPU | 12 | 12 | 12 | 12 |
| ENSACO™ 250 Carbon black | 17 | 17 | 12 | 12 |
| IRGANOX® 245 antioxidant | 0.3 | 0.3 | 0.3 | 0.3 |
| MFI (g/10 min) | 5.4 | 2 | 10.2 | 5.7 |
| Impact strength (kJ/m$^2$) | 4.6 | 5.9 | 6.6 | 7.4 |
| Tensile modulus (MPa) | 1740 | 1725 | 1390 | 1350 |
| Vol. Resistiv. (ohm·cm) | 3 | 2.5 | $1.8 \times 10^4$ | $2.4 \times 10^4$ |

*HOSTAFORM ® C52021, MFI = 50 g/10 min
**HOSTAFORM ® C27021, MFI = 27 g/10 min
***HOSTAFORM ® C13021, MFI = 13 g/10 min As shown in Table 3, samples A and B, and samples C and D, used the same quantities of different types of the acetal polymer resin having various MFI's. Higher quantities of the conductive carbon black were used in samples A and B. The polyurethane and antioxidant quantities were the same in all samples. While all of the samples reported good electrical properties, the mechanical and flow properties of the samples varied. It can be seen that samples A and B were highly electrically conductive, very rigid and impact resistant, while maintaining an excellent fluidity and processability. Particularly high flow composition was obtained in sample C in comparison to sample D. The properties of samples C and D reveal a very good electrical conductivity, inferior however to samples A and B, associated with very high toughness and impact strength. Samples C and D also presented lower rigidity (flexural modulus).

EXAMPLE III

To determine the effect of the polyurethane content on the impact strength (kJ/m$^2$) and tensile modulus (MPa) of the conductive polyacetal composition, the sample B composition (as reported in Table 3, EXAMPLE II) was evaluated and compared to derivative compositions (samples E and F) with different polyurethane (and acetal resin) contents within the scope of the present invention. The samples were prepared with the formulation of sample B (percent, by weight) listed in Table 3. Each sample was evaluated, and the impact strength and tensile modulus were measured. The results are also reported below in Table 4.

TABLE 4

| SAMPLE | TPU content | Impact strength (kJ/m$^2$) | Tensile modulus (MPa) |
|---|---|---|---|
| E | 10 | 5.4 | 1850 |
| B | 12 | 5.9 | 1725 |
| F | 15 | 6.0 | 1470 |

As shown in Table 4, the impact strength of the conductive polyacetal composition slightly increased as the polyurethane content was increased. The decrease in tensile modulus as the polyurethane content was increased is significantly more important. The decrease means that the polyurethane content has an effect on the resulting mechanical properties of the composition, allowing, for example, materials characterized by a very good impact resistance associated with very different behaviors under tensile stress conditions.

Although particular embodiments of the invention have been described in detail for purposes of illustration, various modifications may be made without departing from the spirit and scope of the invention. For example, the oxymethylene polymers used in the invention may include plasticizers, formaldehyde scavengers, mold lubricants, antioxidants, fillers, colorants, reinforcing agents, light stabilizers, other types of stabilizers, pigments, and the like, so long as the additives do not materially affect the desired properties, including enhancement of impact strength and electrical conductivity, of the resulting conductive polyacetal composition and the articles molded therefrom. Accordingly, the invention is not to be limited except as by the appended claims.

What is claimed is:

1. An electrically conductive polyacetal resin composition, comprising:

between about 65 and about 85 percent, by weight, of an oxymethylene polymer;

between about 10 and about 20 percent, by weight, of an electrically conductive carbon black having a surface area, BET (N$_2$) of between about 40 and about 100 m$^2$/g, and a pore volume, DBP absorption, of between about 150 and about 350 ml/100g; and between about 10 and about 20 percent, by weight, of an elastomeric polyurethane.

2. The polyacetal resin composition of claim 1, further comprising at least 0.5 percent, by weight, of an antioxidant.

3. The polyacetal resin composition of claim 1, wherein said composition comprises between about 70 and 80 percent, by weight, of said oxymethylene polymer.

4. The polyacetal resin composition of claim 3, wherein said composition comprises about 75 percent, by weight, of said oxymethylene polymer.

5. The polyacetal resin composition of claim 1, wherein said composition comprises between about 12 and 17 percent, by weight, of said carbon black.

6. The polyacetal resin composition of claim 5, wherein said composition comprises about 12 percent, by weight, of said carbon black.

7. The polyacetal resin composition of claim 1, wherein said composition comprises between about 10 and 15 percent, by weight, of said elastomeric polyurethane.

8. The polyacetal resin composition of claim 7, wherein said composition comprises about 12%, by weight, of said elastomeric polyurethane.

9. The polyacetal resin composition of claim 1, wherein said carbon black has a surface area, BET ($N_2$), of between about 40 and about 70 $m^2/g$, and a pore volume, DBP absorption, of between about 150 and about 200 ml/100g.

10. The polyacetal resin composition of claim 9, wherein said carbon black has a surface area, BET ($N_2$), of about 65 $m^2/g$, and a pore volume, DBP absorption, of about 190 ml/100g.

* * * * *